United States Patent
Yang et al.

(10) Patent No.: US 11,576,102 B2
(45) Date of Patent: Feb. 7, 2023

(54) METHOD AND DEVICE FOR IMPLEMENTING AD HOC NETWORK ROUTING PROTOCOL IN MULTI-AGENT SYSTEM

(71) Applicant: BEIJING UNIVERSITY OF POSTS AND TELECOMMUNICATIONS, Beijing (CN)

(72) Inventors: Shaoshi Yang, Beijing (CN); Die Hu, Beijing (CN); Zhao Ma, Beijing (CN); Jun Ma, Beijing (CN); Yonglu Wen, Beijing (CN); Min Gong, Beijing (CN); Xuejun Zhu, Beijing (CN)

(73) Assignee: BEIJING UNIVERSITY OF POSTS AND TELECOMMUNICATIONS, Beijing (CN)

(*) Notice: Subject to any disclaimer, the term of this patent is extended or adjusted under 35 U.S.C. 154(b) by 0 days.

(21) Appl. No.: 17/747,574

(22) Filed: May 18, 2022

(65) Prior Publication Data
US 2022/0353781 A1 Nov. 3, 2022

(51) Int. Cl.
*H04W 40/02* (2009.01)
*H04W 40/20* (2009.01)
(Continued)

(52) U.S. Cl.
CPC .......... *H04W 40/026* (2013.01); *H04W 4/44* (2018.02); *H04W 40/20* (2013.01);
(Continued)

(58) Field of Classification Search
None
See application file for complete search history.

(56) References Cited

U.S. PATENT DOCUMENTS

| 10,172,068 B2* | 1/2019 | Mosko .................... H04L 41/40 |
| 2005/0160172 A1* | 7/2005 | Eytchison ........... H04L 12/2832 |
| | | 709/227 |

(Continued)

FOREIGN PATENT DOCUMENTS

| CN | 105657777 A | 6/2016 |
| CN | 107222901 A | 9/2017 |
| CN | 108684063 A | 10/2018 |

OTHER PUBLICATIONS

Yang Kui-Wu, Guo Yuan-Bo, Ma Jun, Zheng Kang-Feng; A NetCoding-based Delay-sensitive Broadcast Transmission Scheme for Delay Tolerant Mobile Sensor Networks; Journal of Electronics & Information Technology, vol. 34 No. 5, May 2012; Institute of Electronic Technology, Information Engineering University, Zhengzhou 450004, China.

*Primary Examiner* — Brian S Roberts

(57) ABSTRACT

Disclosed are a method and device for implementing an ad hoc network routing protocol in a multi-agent system. The device includes a trajectory information acquisition module, a data packet delivery module, a delivery confirmation module, a data packet forwarding module, a data transmission feedback module and a data storage module. The method includes: acquiring a separation and rendezvous timing table and an adjacency matrix of an ad hoc network composed of multiple agents at a given moment; if a source node has message sending requirement, performing data packet delivery and delivery confirmation based on the separation and rendezvous timing table and the adjacency matrix; and performing data packet forwarding and transmission status feedback by a non-source node.

10 Claims, 3 Drawing Sheets

(51) Int. Cl.
*H04W 4/44* (2018.01)
*H04W 40/24* (2009.01)
*H04W 40/34* (2009.01)
H04W 84/18 (2009.01)
H04W 84/00 (2009.01)

(52) U.S. Cl.
CPC ......... *H04W 40/248* (2013.01); *H04W 40/34* (2013.01); *H04W 84/005* (2013.01); *H04W 84/18* (2013.01)

(56) References Cited

U.S. PATENT DOCUMENTS

| | | |
|---|---|---|
| 2015/0085668 A1 | 3/2015 | Guo et al. |
| 2017/0041868 A1 | 2/2017 | Palin et al. |
| 2017/0111271 A1* | 4/2017 | Thubert ................ H04L 45/121 |

* cited by examiner

METHOD AND DEVICE FOR IMPLEMENTING AD HOC NETWORK ROUTING PROTOCOL IN MULTI-AGENT SYSTEM

CROSS-REFERENCE TO RELATED APPLICATIONS

This application claims the benefit of priority from Chinese Patent Application No. 202110550978.5, filed on May 18, 2021. The content of the aforementioned application, including any intervening amendments thereto, is incorporated herein by reference in its entirety.

TECHNICAL FIELD

This application relates to communication technology, and more particularity to a method and a device for implementing an ad hoc network routing protocol in a multi-agent system.

BACKGROUND

An agent is an entity that can sense the environment through sensors and act on the environment through an actuator, and includes vehicles, robots, artificial satellites, flying vehicles and other controlled devices. Multi-agent system (MAS) can accomplish complex tasks based on interaction between multiple agents, and now has been widely used in aircraft formation, multi-robot collaborative control and transportation vehicle control.

An ad hoc network composed of multiple agents is a centerless and multi-hop wireless network, which can be flexibly deployed without relying on fixed facilities and adopts agents as nodes. The ad hoc network composed of multiple agents can be used to support the signal and information transmission between agents in MAS, which is necessary for functions of the MAS. In some fields such as emergency rescue and coordinated operation, the ad hoc network composed of multiple agents has a brilliant application prospect.

Traditional mobile ad hoc network (MANET) routing protocol is designed for randomly-movable nodes, i.e., movable agents. Due to the nodal random movement, to ensure the reliability and robustness of data transmission, a large number of control packets are required for route discovery and router table maintenance, which may cause the network performance to fail to meet requirements of the MAS. Specifically, the frequent route discovery in an on-demand routing protocol will increase the occurrence of transmission medium access violations, which leads to the retransmission of a large number of data packets, and extends the transmission delay, attenuating the network performance. The regular routing table maintenance in active routing protocols occupies more bandwidth and larger storage space, making the active routing protocols difficult to adapt to rapid topological changes. In addition, for an unstable link, the presence of a large number of control packets will not only affect the transmission of data packets, but also consume computing resources, communication resources, storage resources and energy resources.

SUMMARY

In order to overcome the above-mentioned problems in the traditional MANET routing protocol that the dependence on a large number of control packets for route discovery and router table maintenance will make the network performance fail to meet communication requirements of the MAS, the present disclosure provides a method and device for implementing an ad hoc network routing protocol in a multi-agent system. Considering that the agent is controllable, and has a predictable motion state, the routing is specially designed, and a priori known information of the application layer is fully utilized by using collaborative trajectory planning, so as to solve the problems in the MANET routing protocol, such as low packet delivery rate, high routing overhead, large end-to-end delay and difficulty in meeting requirements of large-scale networks. This application is of great significance for the ad hoc network communication of the multi-agent system.

Technical solutions of this application are specifically described as follows.

In a first aspect, this application provides a device for implementing an ad hoc network routing protocol in multi-agent system (MAS), comprising:
  a trajectory information acquisition module;
  a data packet delivery module;
  a delivery confirmation module;
  a data packet forwarding module;
  a data transmission feedback module; and
  a data storage module;
  wherein the trajectory information acquisition module, the data packet delivery module, the delivery confirmation module, the data packet forwarding module, the data transmission feedback module and the data storage module are arranged at each of a plurality of nodes of the MAS;
  the trajectory information acquisition module is configured to obtain a separation and rendezvous timing table and an adjacency matrix of an ad hoc network of the multi-agent system at a given moment, which are output by a collaborative control algorithm of the MAS; the separation and rendezvous timing table is configured to record a separation moment and a rendezvous moment of each node (or node set) in the ad hoc network; and the adjacency matrix is configured to record a communication link between the plurality of nodes; a separation of two nodes (or two node sets) means that one node (or node set) leaves a communication range of the other node (or node set), and the two nodes cannot communicate with each other; a rendezvous of two nodes (or two node sets) means that one node (or node set) enters a communication range of the other node (or node set), and the two nodes can communicate; and nodes in a same node set are capable of communicating with each other;
  when a current node has message sending requirement, a corresponding data packet delivery module is called; the data packet delivery module is configured to read the separation and rendezvous timing table to determine whether the current node is capable of rendezvousing with a destination node (or a node set containing the destination node) within a message validity period; if not, the data packet delivery module is configured to notify the current node to cancel a sending task; otherwise, the data packet delivery module is configured to read the adjacency matrix to determine whether there is a path from the current node to the destination node within the message validity period; if not, the data packet delivery module is configured to notify the current node to cancel the sending task; otherwise, the data packet delivery module is configured to find an optimal path from the current node to the destination node within the message validity period by the adjacency matrix and optimal path algorithm, add the optimal path to a packet header of a to-be-sent data packet, send the to-be-sent data packet at a moment when the destination node is reachable, and store the to-be-sent data packet in the data storage module of the current node; the message validity period represents a timeliness of message, which refers to a time when the message is meaningful, and can be specified on demand; and the optimal path algorithm can be implemented by using many different design methods, as long as the optimal path from a source node to the destination node can be obtained;

the delivery confirmation module is configured to determine whether to redeliver the to-be-sent data packet in the message validity period based on whether a route reply (RREP) packet fed back by the destination node or a route error (RRER) packet fed back by an intermediate node is received after the current node sends the to-be-sent data packet;

the data packet forwarding module is configured to perform packet forwarding according to a packet type recorded in a packet header of a packet received by the current node; if the packet is a control packet, the data packet forwarding module is configured to directly forward the control packet based on a reverse path of a stored path in the packet header of the packet; if the packet is a data packet, the data packet forwarding module is configured to forward the data packet based on routing hop count and routing node address recorded in the packet header of the data packet and store the packet header of the data packet in the data storage module of the current node; and the control packet is the RREP packet or the RRER packet;

the data transmission feedback module is configured to feed data transmission status to a source node after the current node receives a data packet; if the current node is the destination node, the data transmission feedback module is configured to feed the RREP packet to the source node based on a reverse path of a stored path in a packet header of the data packet; if the current node is not the destination node, and does not receive a control packet supposed to be fed back by a successor node within a predetermined period after forwarding the data packet, the data transmission feedback module is configured to feed the RRER packet to the source node based on a reverse path of a stored path in a packet header of a data packet stored in the data storage module; the successor node comprises a node set containing all nodes between a next hop node of the current node and the destination node in the stored path in the packet header; and the data storage module is configured to store the to-be-sent data packet of the current node and the packet header of the data packet forwarded by the current node.

In a second aspect, this application provides a method for implementing an ad hoc network routing protocol in a multi-agent system, comprising:

(S1) acquiring a separation and rendezvous timing table and an adjacency matrix of an ad hoc network of the MAS at a given moment, wherein the separation and rendezvous timing table is configured to record a separation moment and a rendezvous moment of each node (or node set) in the ad hoc network, and the adjacency matrix is configured to record a communication link between nodes in the ad hoc network;

(S2) if a current node is a source node having message sending requirement, performing data packet delivery and delivery confirmation;

wherein the data packet delivery is performed through steps of:

determining whether the source node (or a node set containing the source node) is capable of rendezvousing with a destination node (or a node set containing the destination node) within a message validity period according to the separation and rendezvous timing table;

if not, allowing the source node to cancel message sending task; otherwise, determining, by the source node, whether there is a path from the source node to the destination node within the message validity period based on the adjacency matrix; if not, allowing the source node to cancel the message sending task; otherwise, finding, by the source node, an optimal path from the source node to the destination node within the message validity period; adding the optimal path to a packet header of a to-be-sent data packet; sending the to-be-sent data packet at a moment when the destination node is reachable, and storing the to-be-sent data packet in the source node;

the delivery confirmation is performed through a step of:

determining, by the source node, whether to complete the data packet delivery or to redeliver the to-be-sent data packet within the message validity period based on whether the source node receives a RREP packet fed back by the destination node or a RRER packet fed back by an intermediate node;

(S3) when the current node is a non-source node, performing packet differentiation, forwarding and transmission status feedback through steps of:

(S31) determining whether a data packet or a control packet is received by the non-source node according to a packet type stored in a packet header of a packet, wherein the control packet is the RREP packet or the RRER packet;

(S32) if a data packet is received, determining whether the current node is the destination node; if yes, feeding the RREP packet to the source node along a reverse path of a path stored in the packet header; if not, forwarding the data packet to a next hop node along the path stored in the packet header, storing a packet header of the data packet, and starting a control packet wait timer to wait for a successor node feeding the control packet; if a control packet of the data packet is not received from a successor node when the control packet wait timer expires, feeding, by the current node, the RRER packet to the source node along a reverse path of a path stored in a packet header of a forwarded data packet, wherein the successor node comprises a node set containing all nodes between a next hop node of the current node and the destination node in the stored path in the packet header; and (S33) if a control packet is received, turning off, by the current node, the control packet wait timer based on information recorded in the packet header of the data packet; and forwarding the data packet to the source node based on the reverse path of the path stored in the packet header.

In a third aspect, this application provides a non-transitory computer readable storage medium, wherein a computer program instruction is stored in the non-transitory computer readable storage medium, and the computer program instruction is configured to be executed by a processor to implement the above-mentioned method.

Compared to the prior art, this application has the following beneficial effects.

A trajectory information output from a cooperative agent motion control module is integrated into a data transmission process designed by routing protocols with a cross-disciplinary and cross-protocol-layer method. Therefore, the trajectory information is enabled to be used not only for application-level tasks such as navigation, guidance, and attitude control, but also for communication routing processes, and for improving an information utilization and reducing an uncertainty in route generation, such that a route discovery and router table maintenance are free from control packets of traditional network communications. In addition, considering an actual message validity period, a repeated sending of expired messages which occupies transmission resources is avoided. This application reduces route discovery and maintenance overhead, reduces end-to-end transmission delay, and improves the packet transmission rate in the implementation of ad hoc network routing protocol in multi-agent system.

DETAILED DESCRIPTION OF EMBODIMENTS

The present disclosure will be described below in detail with reference to the embodiments and accompanying drawings.

Compared to a traditional ad hoc network routing protocol, this application takes a collaborative trajectory planning information of an application layer as a priori input of routing protocol. Considering that the agent is controllable, and has a predictable motion state, the routing is specially designed. Due to a priori nature of trajectory planning information to routing protocols, this application achieves a highly-efficient communication and networking of multiple agents. By contrast, the trajectory planning information is not introduced in the traditional ad hoc network routing protocol due to the following reasons. (1) The traditional ad hoc network routing protocol is designed for nodes having random motion; therefore, it fails to perform collaborative planning of node movement trajectory to output trajectory planning information to routing protocol. (2) The traditional ad hoc network routing protocol is designed for generalized networks, where communication nodes may not necessarily be partner nodes, making it difficult to perform trajectory planning.

Multiple nodes of an ad hoc network composed of multiple agents can use a collaborative trajectory planning application to obtain trajectory planning information in real time. In an embodiment, the nodes can obtain a separation and rendezvous timing table and an adjacency matrix of an ad hoc network of the MAS at a given moment by utilizing the trajectory planning information. The separation and rendezvous timing table is configured to record a separation moment and a rendezvous moment of each node (or node set) in the ad hoc network. A separation of two nodes (or two node sets) means that one node (or node set) leaves a communication range of the other node (or node set), and the two nodes cannot communicate with each other. A rendezvous of two nodes (or two node sets) means that one node (or node set) enters a communication range of the other node (or node set), and the two nodes can communicate. Nodes in the same node set are capable of communicating with each other. The adjacency matrix is configured to record a communication link between the nodes. For any two nodes, if a corresponding value in the adjacency matrix is 1, the two nodes are in communication range, that is, the two nodes are linked with each other; or if the corresponding value in the adjacency matrix is 0, the two nodes are out of communication range, that is, the two nodes are disconnected. The separation and rendezvous timing table and the adjacency matrix are updated as a trajectory of nodes is updated.

Figure 1:
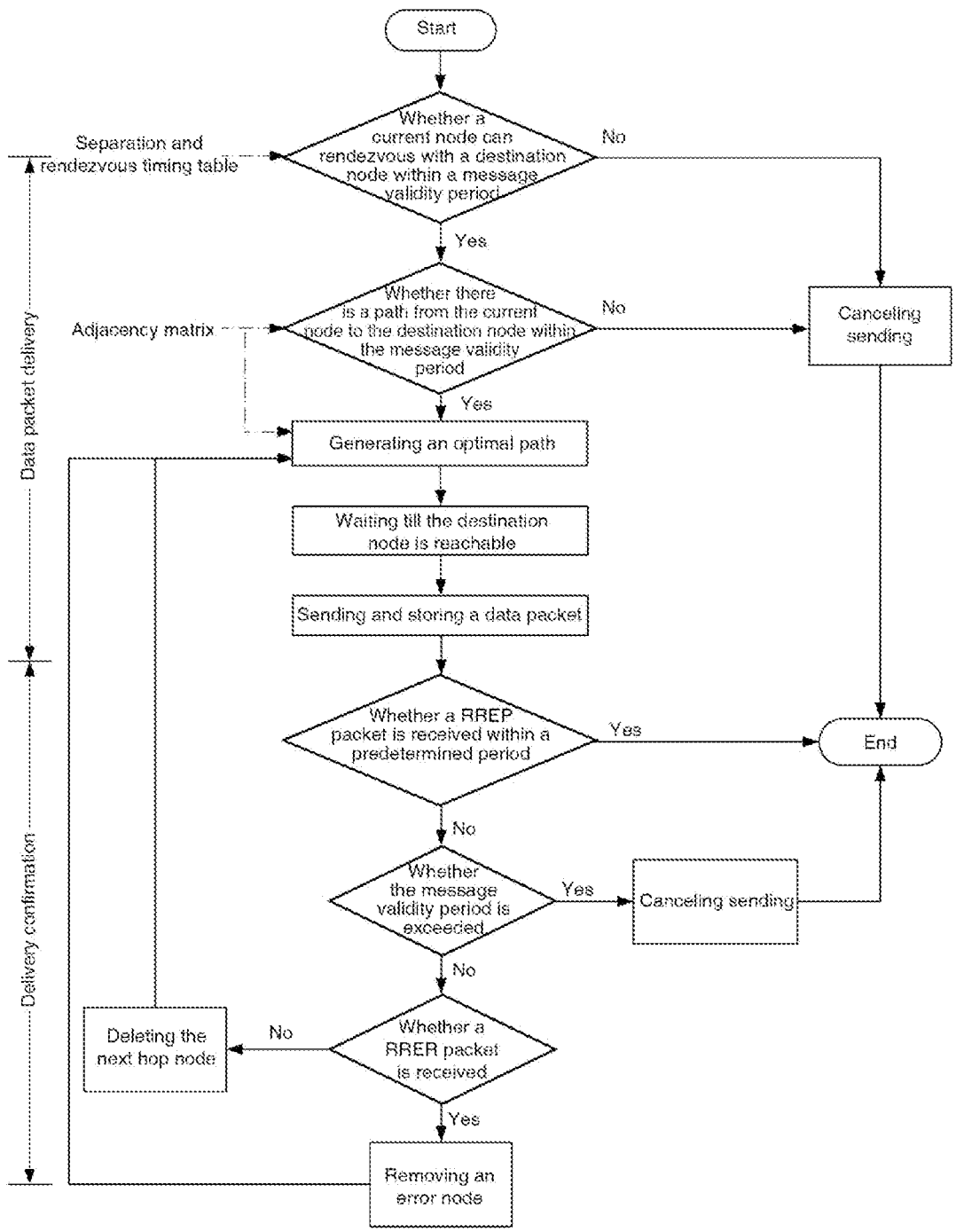
FIG. 1 depicts workflow of a source node in a method for implementing an ad hoc network routing protocol in a multi-agent system according to an embodiment of the present disclosure.

As shown in FIG. 1, in a method for implementing an ad hoc network routing protocol in a MAS, a source node is configured to perform route discovery and router table maintenance, which includes data packet delivery and delivery confirmation.

During the data packet delivery, the source node generates a path and an optimal path according to the separation and rendezvous timing table and the adjacency matrix output by a collaborative control algorithm in a trajectory information acquisition module, and then sends a data packet, which is performed through the following steps.

(S11) Whether the source node (or a node set containing the source node) is capable of rendezvousing with a destination node (or a node set containing the destination node) within a message validity period according to the separation and rendezvous timing table is determined. If not, the source node is allowed to cancel message sending task; otherwise, proceeding to step (S12). The message validity period represents a timeliness of message, which refers to a time when the message is meaningful, and can be specified on demand.

(S12) Whether there is a path from the source node to the destination node within the message validity period is determined by the source node based on the adjacency matrix. If not, the source node is allowed to cancel the message sending task; otherwise, proceeding to step (S13). The path from the source node to the destination node obtained by a path finding algorithm is not designated. The path finding algorithm can be optimal or suboptimal. As long as a path can be found, the message can be transmitted between the source node and destination node and a path finding process is completed.

Figure 2:
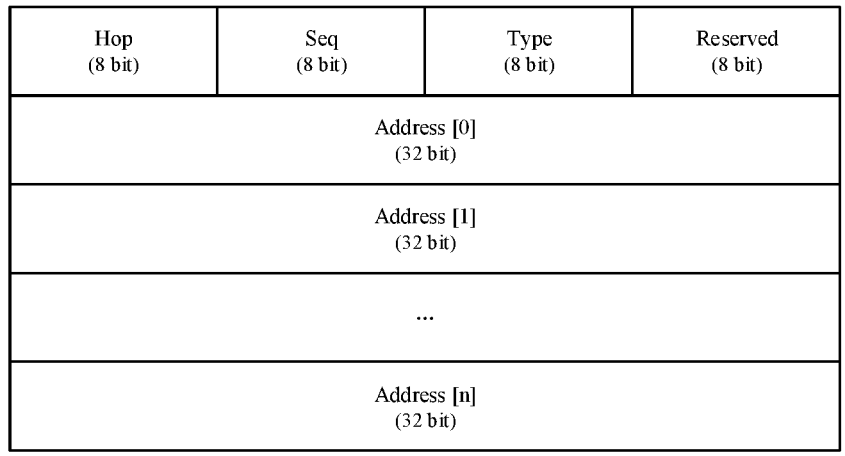
FIG. 2 shows formats of a packet header in the method according to an embodiment of the present disclosure.

(S13) An optimal path from the source node to the destination node within the message validity period is found and added to a packet header of a to-be-sent data packet. A format of the packet header is shown in FIG. 2. The optimal path from a current node to the destination node is found by using optimal path finding algorithm according to the adjacency matrix. If multiple paths are obtained, any one of the paths is selected. The optimal path finding algorithm can be implemented by using different existing design methods, as long as the optimal path from the source node to the destination node can be obtained.

(S14) A control packet wait timer is started by the source node to wait till a destination node reachable moment, and then step (S15) is performed. The destination node reachable moment is a moment when a data packet sent by the source node can be transmitted to the destination node along a set path according to the separation and rendezvous timing table and the adjacency matrix.

(S15) The source node sends the data packet along the optimal path and stores the data packet.

During delivery confirmation, in order to ensure a reliability of the data packet delivery, whether to redeliver the delivery confirmation is determined by the source node according to a small number of control packets, which is performed through the following steps.

(S16) Whether the RREP packet fed back by the destination node is received within a predetermined period is determined by the source node. If yes, it indicates that the to-be-sent data packet has been successfully delivered, and the delivery confirmation is finished. If not, step (S17) is performed. The predetermined period is a constant value set by users according to network specifics and needs, which can be reconfigured if the network specifics and needs change, but is generally not greater than the message validity period.

(S17) Whether the message validity period has expired is determined, if yes, sending of the to-be-sent data packet is canceled and the delivery confirmation is completed. If not, step (S18) is performed.

(S18) Whether the source node receives a RRER packet fed back by an intermediate node is determined. If yes, an error node is removed, and step (S13) is performed till the delivery confirmation is completed. The error node is a next hop node of the intermediate node which feeds the RRER packet as recorded in the path stored in the packet header of the data packet. If not, step (S19) is performed.

(S19) A next hop node of the source node is removed followed by proceeding to the step (S13) till the delivery confirmation is completed.

As shown in FIG. 2, the packet header of the to-be-sent data packet is set to include a Hop field, a Seq field, a Type field, a Reserved field and an Address field.

the Hop field indicates the number of routing node hops experienced when delivering the to-be-sent data packet along the optimal path, and is configured to determine the number of to-be-read route node address (Address) to facilitate data processing by the current node.

the Seq field represents a sequence number of a data packet generated by the source node and sent to the destination node, and is configured to identify individual data packets. A sequence number of the first data packet generated by the source node is Seq=0. For each data packet generation, Seq+1 is executed. Data packets are distinguished according to the source node and the sequence number.

the Type field represents a type of the received packet, and is configured to distinguish the data packet, the RREP packet and the RRER packet.

The Reserved field represents a reserved field configured to achieve other extended functionality implementation.

The Address field represents all route node on the optimal path from the source node to the destination node, and is configured to store an IP address of each node and a cascaded string uniquely identifying each node. All nodes in the optimal path are shown in FIG. 2 in order.

As shown in FIG. 2, a length of the Hop field, the Seq field, the Type field and the Reserved field are all 8 bit, and a length of the Address field is 32 bit.

The meanings and values of the above-mentioned fields can be adjusted according to actual needs of the network, as long as the above required functions are achieved.

Figure 3:
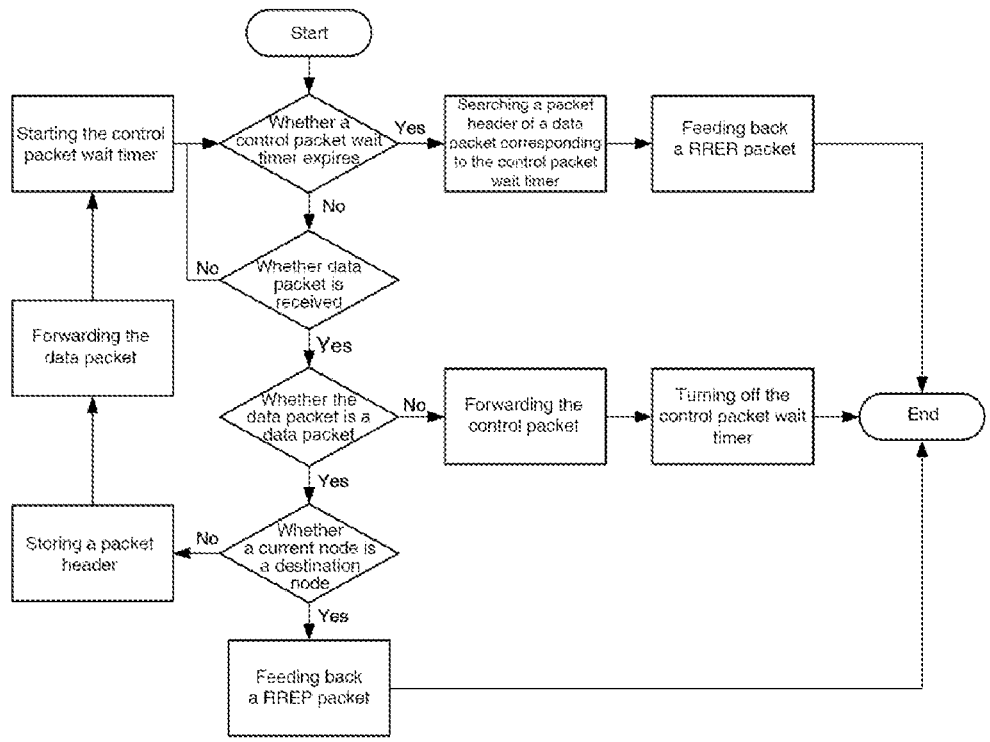
FIG. 3 shows a workflow of a non-source node in the method according to an embodiment of the present disclosure.

As shown in FIG. 3, in the method provided herein, a packet forwarding and data transmission feedback are performed by a non-source node through the following steps.

(S21) Whether the predetermined period of the control packet waiting timer has expired is determined by the non-source node. If yes, packet headers stored in the non-source node are searched to find a packet header of a data packet corresponding to the control packet waiting timer which has expired. The RRER packet is sent to the source node according to an information stored in the packet header, and the packet forwarding and data transmission feedback are completed. Otherwise, step (S22) is performed. The control packet waiting timer is configured to record a waiting time to determine if the predetermined period has been expired. One forwarded data packet in a node corresponds to one control packet waiting timer.

(S22) Whether the non-source node receives the data packet is determined. If yes, step (S23) is performed; otherwise, it is required to return to the step (S21).

(S23) Whether the received packet is a data packet is determined by the non-source node. If yes, whether the non-source node is a destination node is determined. If yes, the RREP packet is fed to the source node by the non-source node, and the packet forwarding and data transmission feedback is completed. If the non-source node is not a destination node, the packet header of the data packet is stored by the non-source node, the data packet is forwarded based on routing hop count and routing node address recorded in the packet header of the data packet, and the control packet waiting timer of the data packet is started followed by proceeding to the step (S21).

(S24) If the received data packet is a control packet, the control packet is forwarded by the non-source node based on routing hop count and routing node address recorded in the packet header, the control packet waiting timer is turned off according to an information recorded by the packet header, and the packet forwarding and data transmission feedback is completed. The control packet is the RREP packet or the RRER packet.

When the destination node feeds the RREP packet to the source node and the intermediate node feeds the RRER packet to the source node, a reverse path of a stored path in the packet header of the data packet is utilized.

Figure 4:
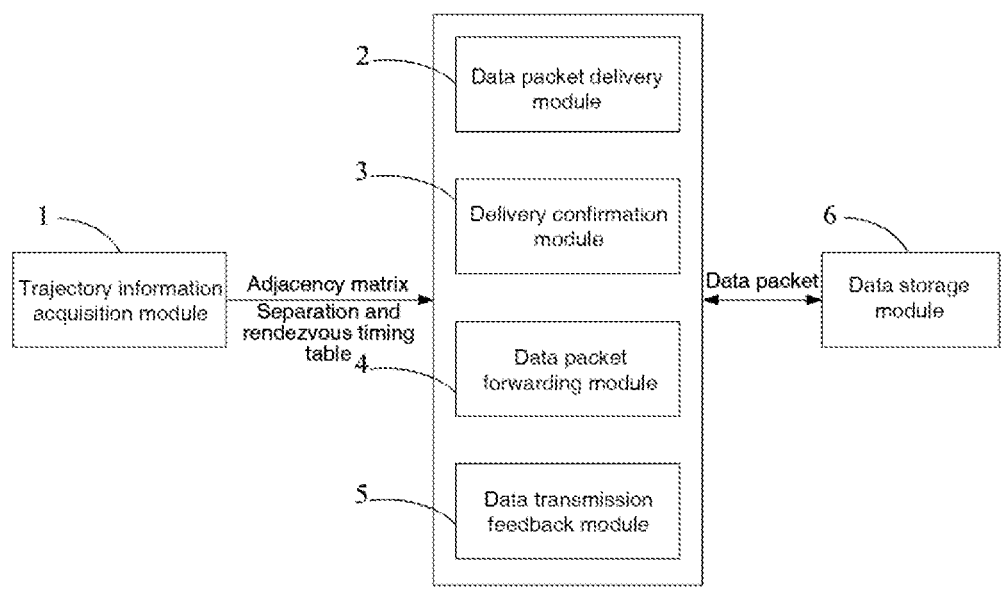
FIG. 4 schematically depicts a device for implementing the ad hoc network routing protocol in a multi-agent system according to an embodiment of the present disclosure.

As shown in FIG. 4, a device for implementing an ad hoc network routing protocol in multi-agent system provided herein is arranged at each node of the MAS. The device includes a trajectory information acquisition module 1, a data packet delivery module 2, a delivery confirmation module 3, a data packet forwarding module 4, a data transmission feedback module 5 and a data storage module 6. When a current node has message sending requirement, the current node is the source node, and the trajectory information acquisition module 1, the data packet delivery module 2 and the delivery confirmation module 3 are called to send a data packet. If a node is a non-source node, the data packet forwarding module 4 and the data transmission feedback module 5 are called to forward the data packet and feed a data transmission status.

The trajectory information acquisition module 1 is configured to call a collaborative control algorithm of MAS to perform a collaborative planning and control of node movement trajectory and obtain a separation and rendezvous timing table and an adjacency matrix of an ad hoc network of the MAS, all of which are output by the collaborative control algorithm of MAS. The separation and rendezvous timing table is configured to record a separation moment and a rendezvous moment of each node (or node set) in the ad hoc network. The adjacency matrix is configured to record a communication link between the plurality of nodes.

When a current node has message sending requirement, the data packet delivery module 2 is configured to determine whether the current node is capable of rendezvousing with the destination node (or a node set containing the destination node) within a message validity period by reading the separation and rendezvous timing table. If not, the data packet delivery module is configured to notify the current node to cancel a sending task. Otherwise, the data packet delivery module is configured to read the adjacency matrix to determine whether there is a path from the current node to the destination node within the message validity period. If not, the data packet delivery module is configured to notify the current node to cancel the sending task. Otherwise, the data packet delivery module is configured to find an optimal path from the current node to the destination node within the message validity period by the adjacency matrix and optimal path algorithm, add the optimal path to a packet header of a to-be-sent data packet, send the to-be-sent data packet at a moment when the destination node is reachable, and store the to-be-sent data packet in the data storage module 6.

The delivery confirmation module 3 is configured to determine whether to redeliver the to-be-sent data packet in the message validity period based on whether a RREP packet fed back by the destination node or a RRER packet fed back by an intermediate node is received after the current node sends the to-be-sent data packet. the delivery confirmation module 3 is configured to notify the current node that the to-be-sent data packet has been delivered when receiving the RREP packet fed back by the destination node within a predetermined period. If the RREP packet fed back by the destination node is not received within the predetermined period but the RRER packet fed back by the intermediate node has been received within the message validity period, the delivery confirmation module 3 is configured to remove an error node and notify the data packet delivery module 1 to re-generate an optimal path from the current node to the destination node, and resend the to-be-sent data packet, wherein the error node is a next hop node of the intermediate node. If the RRER packet fed back by the intermediate node is not received within the message validity period, the delivery confirmation module 3 is configured to remove a next hop node of the current node and notify the data packet delivery module 1 to re-generate an optimal path and resend the to-be-sent data packet.

The data packet forwarding module 4 is configured to perform data forwarding according to a packet header of a packet received by the current node. If the packet is a control packet, the data packet forwarding module 4 is configured to directly forward the control packet based on a reverse path of a store path in the packet header of the packet. If the packet is a data packet, the data packet forwarding module 4 is configured to forward the data packet based on routing hop count and routing node address recorded in the packet header of the data packet and store the packet header of the data packet in the data storage module 6 of the current node.

When the current node receives the data packet, if the current node is the destination node, the data transmission feedback module 5 is configured to feed the RREP packet back to the source node based on a reverse path of a store path in a packet header of the data packet. If the current node is not the destination node, the data packet forwarding module 4 is configured to start a control packet waiting timer after forwarding the data packet. If the control packet fed back by a successor node is not received within the predetermined period, that is, the control packet waiting timer has expired, the RRER packet is fed to the source node along the reverse path of the stored path of the packet header of a corresponding data packet stored in the data storage module 6. If a control packet of the corresponding data packet is received before the control packet waiting timer has expired, the control packet waiting timer is turned off.

The data storage module 6 is configured to store the to-be-sent data packet of the current node when it is the source node and the packet header of the received data packet when it is a non-source node.

When the current node has re-send requirement, the data packet is extracted from the data storage module 6. A data storage format is presented as follows:

| Des | Seq | Time | Data |
|---|---|---|---| where Des represents the destination node; Seq represents a sequence number of the data packet; Time represents a storage validity period; and Data represents a stored to-be-sent data packet. One destination node with one sequence number uniquely identifies one to-be-sent data packet. A storage validity period is Time. If the storage validity period is exceeded, the data storage module 6 is configured to delete the to-be-sent data packet.

The current node is configured to store a packet header of a forwarded data packet. If the current node does not receive the control packet fed back by the successor node within the predetermined period after forwarding the data packet, the current node is configured to extract a packet header from the data storage module 6. A data storage format is shown as follows:

| Des | Seq | Time | Packet Header |
|---|---|---|---| where Des represents the destination node; Seq represents a sequence number of the data packet; Time represents a storage validity period; and Packet Header represents a stored packet header. One destination node with one sequence number uniquely identifies one message transmission. A storage validity period is Time. If the storage validity period is exceeded, the data storage module 6 is configured to delete the packet header.

Based on the method and device provided herein, this application further provides a non-transitory computer readable storage medium. A computer program instruction is stored in the non-transitory computer readable storage medium, the computer program instruction is configured to be executed by a processor to implement the above-mentioned method or device. The non-transitory computer readable storage medium is a tangible device that can keep and store instructions used by instruction execution devices, which will not described in detail. The instruction can be written in any one or more programming languages of the prior art.

Application Embodiment 1

When an aerial vehicle formation executes a coordinated cruise mission, aerial vehicles are configured to interact status information (such as speed, position, acceleration and angular velocity) with each other to complete a trajectory plan. By means of the method and device provided herein, a predicted value of position information of the aerial vehicles are used as results of the trajectory plan for further data processing, so as to obtain the separation and rendezvous timing table and the adjacency matrix of each of aerial vehicles (or aerial vehicle subformation), which is configured to determine whether the aerial vehicle formation needs to avoid obstacles at a moment and whether an aerial vehicle (or aerial vehicle subformation) is in communication range with other aerial vehicle (or other aerial vehicle subformation). Through the data packet delivery as shown in FIG. 1, a generation of packet header, sending of data packet and determination of retransmission are completed. Through data packet forwarding and receiving as shown in FIG. 3, data packet forwarding and receiving confirmation are completed.

Application Embodiment 2

When a robot formation executes a coordinated detection mission, robots are configured to interact required status with each other to complete a formation control by calculation. By means of the method and device provided herein, a calculated position output is processed to obtain the separation and rendezvous timing table and adjacency matrix of each robot (or robot subformation), so as to determine whether a robot (or a robot subformation) needs to bypass and whether a robot (or robot subformation) is in communication range with other robot (or other robot subformation). Through the data packet delivery as shown in FIG. 1, a generation of packet header, sending of data packet and determination of retransmission are completed. Through data packet forwarding and receiving as shown in FIG. 3, data packet forwarding and receiving confirmation are completed.

Described above are only some embodiments of the present disclosure, which are not intended to limit the disclosure. Any variations and modifications made by those of ordinary skilled in the art without departing from the spirit of the disclosure should fall within the scope of the disclosure defined by the appended claims.

What is claimed is:

1. A device for implementing an ad hoc network routing protocol in a multi-agent system (MAS), comprising:
   a trajectory information acquisition module;
   a data packet delivery module;
   a delivery confirmation module;
   a data packet forwarding module;
   a data transmission feedback module; and
   a data storage module;
   wherein the trajectory information acquisition module, the data packet delivery module, the delivery confirmation module, the data packet forwarding module, the data transmission feedback module and the data storage module are arranged at each of a plurality of nodes of the MAS;
   the trajectory information acquisition module is configured to obtain a separation and rendezvous timing table and an adjacency matrix of an ad hoc network of the multi-agent system at a given moment; the separation and rendezvous timing table is configured to record a separation moment and a rendezvous moment of each node in the ad hoc network; and the adjacency matrix is configured to record a communication link between the plurality of nodes;
   when a current node has message sending requirement, a corresponding data packet delivery module is called; the data packet delivery module is configured to read the separation and rendezvous timing table to determine whether the current node is capable of rendezvousing with a destination node within a message validity period; if not, the data packet delivery module is configured to notify the current node to cancel a sending task; otherwise, the data packet delivery module is configured to read the adjacency matrix to determine whether there is a path from the current node to the destination node within the message validity period; if not, the data packet delivery module is configured to notify the current node to cancel the sending task; otherwise, the data packet delivery module is configured to find an optimal path from the current node to the destination node within the message validity period, add the optimal path to a packet header of a to-be-sent data packet, send the to-be-sent data packet at a moment when the destination node is reachable, and store the to-be-sent data packet in the data storage module of the current node;
   the delivery confirmation module is configured to determine whether to redeliver the to-be-sent data packet within the message validity period according to whether a route reply (RREP) packet back fed back by the destination node or a route error (RRER) packet fed back by an intermediate node is received after the current node sends the to-be-sent data packet;
   the delivery confirmation module is configured to notify the current node that the to-be-sent data packet has been delivered when receiving the RREP packet fed back by the destination node within a predetermined period; if the RREP packet fed back by the destination node is not received within the predetermined period but the RRER packet fed back by the intermediate node has been received within the message validity period, the delivery confirmation module is configured to remove an error node and notify the data packet delivery module to re-generate an optimal path from the current node to the destination node, and resend the to-be-sent data packet, wherein the error node is a next hop node of the intermediate node; and if the RRER packet fed back by the intermediate node is not received within the message validity period, the delivery confirmation module is configured to remove a next hop node of the current node and notify the data packet delivery module to re-generate an optimal path and resend the to-be-sent data packet;
   the data packet forwarding module is configured to perform packet forwarding according to a packet type recorded in a packet header of a packet received by the current node; if the data packet is a control packet, the data packet forwarding module is configured to directly forward the data packet based on a reverse path of a store path in the packet header of the data packet, wherein the control packet is the RREP packet or the RRER packet; and if the data packet is a data packet, the data packet forwarding module is configured to forward the data packet based on routing hop count and routing node address recorded in the packet header of the data packet and store the packet header of the data packet in the data storage module of the current node;
   the data transmission feedback module is configured to feed data transmission status back to a source node after the current node receives a data packet; if the current node is the destination node, the data transmission feedback module is configured to feed the RREP packet back to the source node based on the reverse path of a stored path in a packet header of the data packet; and if the current node is not the destination node, and a control packet fed back by a successor node is not received within the predetermined period after forwarding the data packet, the data transmission feedback module is configured to feed the RRER packet to the source node based on the reverse path of a stored path in a packet header of a data packet forwarded and stored in the data storage module; and the data storage module is configured to store the to-be-sent data packet of the current node and the packet header of the data packet forwarded by the current node.

2. The device of claim 1, wherein the packet header of the to-be-sent data packet and the packet header of the data packet forwarded are set to comprise a Hop field, a Seq field, a Type field and an Address field;

wherein the Hop field indicates the number of routing node hops experienced when delivering the to-be-sent data packet and the to-be-forwarded data packet along the optimal path;

the Seq field indicates a sequence number of a data packet generated by the source node and sent to the destination node, and is configured to identify individual data packets;

the Type field indicates a type of the received packet, and is configured to distinguish the data packet, the RREP packet and the RRER packet; and the Address field indicates all nodes on the optimal path from the source node to the destination node, and is configured to store an IP address of each node and a cascaded string cascade uniquely identifying each node.

3. The device of claim 2, wherein every time the current node forwards a data packet, the data transmission feedback module is configured to correspondingly start a control packet wait timer; if the control packet fed back by a successor node on a transmission path of the data packet has not been received when the control packet wait timer expires, the data transmission feedback module is configured to feed the RRER packet to the source node; otherwise, the data transmission feedback module is configured to turn off the control packet wait timer.

4. The device of claim 2, wherein the separation and rendezvous timing table is configured to record a separation moment and a rendezvous moment of each node set in the ad hoc network; and nodes in the same node set are capable of communicating with each other.

5. The device of claim 1, wherein every time the current node forwards a data packet, the data transmission feedback module is configured to correspondingly start a control packet wait timer; if the control packet fed back by a successor node on a transmission path of the data packet has not been received when the control packet wait timer expires, the data transmission feedback module is configured to feed the RRER packet to the source node; otherwise, the data transmission feedback module is configured to turn off the control packet wait timer.

6. The device of claim 1, wherein in the data storage module, the to-be-sent data packet comprises the destination node, a sequence number of the to-be-sent data packet, a storage validity period of the to-be-sent data packet and the to-be-sent data; the packet header of the data packet comprises the destination node, a sequence number of the data packet, a storage validity period of the packet header and packet header data; the destination node and the sequence number of the to-be-sent data packet are together configured to uniquely determine message sending, and the destination node and the sequence number of the data packet are together configured to uniquely determine message forwarding; and if the storage validity period of the to-be-sent data packet or the storage validity period of the packet header data is exceeded, the data storage module deletes stored data.

7. The device of claim 1, wherein the separation and rendezvous timing table is configured to record a separation moment and a rendezvous moment of each node set in the ad hoc network; and nodes in the same node set are capable of communicating with each other.

8. A method for implementing an ad hoc network routing protocol in a MAS, comprising:

(S1) acquiring a separation and rendezvous timing table and an adjacency matrix of an ad hoc network of the MAS at a given moment, wherein the separation and rendezvous timing table is configured to record a separation moment and a rendezvous moment of each node in the ad hoc network, and the adjacency matrix is configured to record a communication link between nodes in the ad hoc network;

(S2) if a current node is a source node having message sending requirement, performing data packet delivery and delivery confirmation;

wherein the data packet delivery is performed through steps of:

determining whether the source node is capable of rendezvousing with a destination node within a message validity period according to the separation and rendezvous timing table;

if not, allowing the source node to cancel message sending task; otherwise determining, by the source node, whether there is a path from the source node to the destination node within the message validity period based on the adjacency matrix; if not, allowing the source node to cancel the message sending task; otherwise, finding, by the source node, an optimal path from the source node to the destination node within the message validity period; adding the optimal path to a packet header of a to-be-sent data packet; sending the to-be-sent data packet at a moment when the destination node is reachable, and storing the to-be-sent data packet in the source node;

the delivery confirmation is performed through a step of:

determining, by the source node, whether to complete the data packet delivery or to redeliver the to-be-sent data packet within the message validity period based on whether the source node receives a RREP packet fed back by the destination node or a RRER packet fed back by an intermediate node;

the source node performs the delivery confirmation through steps of:

determining, by the source node, whether the RREP packet fed back by the destination node is received within a predetermined period; if yes, it indicates that the to-be-sent data packet has been successfully delivered, and the delivery confirmation is finished;

wherein the predetermined period is not greater than the message validity period;

if not, determining whether the message validity period has expired; if yes, canceling sending of the to-be-sent data packet and completing the delivery confirmation;

if the message validity period has not expired, determining whether the source node receives the RRER packet fed back by the intermediate node; if yes, removing an error node and redelivering the to-be-sent data packet;

wherein the error node is a next hop node of the intermediate node that feeds back the RRER packet; and If the source node does not receive the RRER packet fed back by the intermediate node, removing a next hop node of the source node; and redelivering the to-be-sent data packet;

(S3) when the current node is a non-source node, performing data packet forwarding and transmission status feedback through steps of:

(S31) determining whether a data packet or a control packet is received by the non-source node according to a packet type stored in a packet header of a packet, wherein the control packet is the RREP packet or the RRER packet;

(S32) if a data packet is received, determining whether the current node is the destination node; if yes, storing the data packet, and feeding the RREP packet to the source node along a reverse path of a path stored in the packet header; if not, forwarding the data packet to a next hop node along the path stored in the packet header, storing a packet header of the data packet, and starting a control packet wait timer for the data packet; if a control packet of the data packet is not received from a successor node when the control packet wait timer expires, feeding, by the current node, the RRER packet back to the source node along a reverse path of a path stored in a packet header of a forwarded data packet; and (S33) if a control packet is received, turning off, by the current node, the control packet wait timer based on information recorded in the packet header of the data packet; and forwarding the data packet to the source node based on the reverse path of the path stored in the packet header.

9. The method of claim 8, wherein in step (S2), the packet header of the to-be-sent data packet is set to comprise a Hop field, a Seq field, a Type field and an Address field;

the Hop field indicates the number of routing node hops experienced when delivering the to-be-sent data packet along the optimal path;

the Seq field represents a sequence number of a data packet generated by the source node and sent to the destination node, and is configured to identify individual data packets;

the Type field represents a type of the received packet, and is configured to distinguish the data packet, the RREP packet and the RRER packet; and the Address field represents all nodes on the optimal path from the source node to the destination node, and is configured to store an IP address of each node and a cascaded string uniquely identifying each node.

10. A non-transitory computer readable storage medium, wherein a computer program instruction is stored in the non-transitory computer readable storage medium, and the computer program instruction is configured to be executed by a processor to implement the method of claim 8.

\* \* \* \* \*